(12) United States Patent
Au et al.

(10) Patent No.: US 8,700,359 B2
(45) Date of Patent: Apr. 15, 2014

(54) SYSTEM AND METHOD FOR DETECTION OF RADIATION

(75) Inventors: Kwong Wing Au, Bloomington, MN (US); Brian C. Krafthefer, Stillwater, MN (US); Eric Eastwold, Anoka, MN (US)

(73) Assignee: Honeywell International Inc., Morristown, NJ (US)

( * ) Notice: Subject to any disclaimer, the term of this patent is extended or adjusted under 35 U.S.C. 154(b) by 297 days.

(21) Appl. No.: 13/177,769

(22) Filed: Jul. 7, 2011

(65) Prior Publication Data
US 2013/0013260 A1    Jan. 10, 2013

(51) Int. Cl.
*G06F 15/00* (2006.01)

(52) U.S. Cl.
USPC .......................................... 702/189; 250/395

(58) Field of Classification Search
CPC .............. G01T 1/17; G01T 7/00; G01T 1/167
USPC ............ 702/134, 189; 250/395, 370.1, 370.5, 250/370.09, 336.1; 378/57
See application file for complete search history.

(56) References Cited

U.S. PATENT DOCUMENTS

| | | | | |
|---|---|---|---|---|
| 5,532,944 | A * | 7/1996 | Battista | 708/3 |
| 5,679,956 | A * | 10/1997 | Johnston | 250/357.1 |
| 5,705,818 | A * | 1/1998 | Kelbel et al. | 250/361 R |
| 6,591,383 | B1 * | 7/2003 | Michel et al. | 714/704 |
| 6,727,506 | B2 * | 4/2004 | Mallette | 250/394 |
| 6,965,314 | B2 * | 11/2005 | Bohinc, Jr. | 340/539.26 |
| 7,190,265 | B1 * | 3/2007 | Bohinc, Jr. | 340/539.26 |
| 7,391,028 | B1 * | 6/2008 | Rubenstein | 250/370.08 |
| 7,847,260 | B2 * | 12/2010 | Inbar | 250/370.11 |
| 7,957,939 | B2 * | 6/2011 | Bronson et al. | 702/190 |
| 8,324,589 | B2 * | 12/2012 | Rubenstein | 250/395 |
| 2003/0065485 | A1 * | 4/2003 | Zerwekh et al. | 702/188 |
| 2005/0156734 | A1 * | 7/2005 | Zerwekh et al. | 340/539.1 |
| 2007/0096037 | A1 * | 5/2007 | Shapiro et al. | 250/394 |
| 2007/0102648 | A1 * | 5/2007 | Shpantzer et al. | 250/394 |
| 2009/0114830 | A1 * | 5/2009 | Rubenstein | 250/370.08 |
| 2011/0012021 | A1 * | 1/2011 | Inbar | 250/370.08 |
| 2011/0024611 | A1 * | 2/2011 | Cunningham et al. | 250/252.1 |
| 2011/0205361 | A1 * | 8/2011 | Guillot et al. | 348/143 |
| 2011/0266454 | A1 * | 11/2011 | van Bree et al. | 250/395 |
| 2011/0307222 | A1 * | 12/2011 | Rubenstein | 702/189 |

* cited by examiner

*Primary Examiner* — John E Breene
*Assistant Examiner* — Ruihua Zhang
(74) *Attorney, Agent, or Firm* — Schwegman, Lundberg & Woessner, P.A.

(57) ABSTRACT

A system includes a count detector, a communication medium; and a processor coupled to the count detector. The processor continuously receives a plurality of pulses from the count detector. A pulse indicates a detection of a radiation unit emitted from a source material or a background. The processor determines a first period of time based on an expected range of speed of a carrier of the source material, and integrates the plurality of pulses over the first period of time, thereby yielding an integrated count associated with a time at a midpoint of the first period of time. The processor creates a continuous time series of count profiles from a plurality of integrated counts that are computed using a plurality of windows within the first period of time, and shifts each window over a second period of time. The second period of time is shorter than the first period of time. The processor estimates a background count from a history of the count profiles, computes an adaptive threshold based on the estimated background count, and detects the source material when consecutives of the integrated counts exceed the adaptive threshold.

20 Claims, 11 Drawing Sheets

SYSTEM AND METHOD FOR DETECTION OF RADIATION

GOVERNMENT RIGHTS

This invention was made with government support under DARPA's Stoplight Seedling program and contract number HR0011-10-C-0070. The U.S. Government has certain rights in this invention.

TECHNICAL FIELD

The present disclosure relates to a system and method for the detection of a radiation source.

BACKGROUND

A radiation detector outputs a pulse for each detected unit. These pulses are digitized with a data logger into a series of discrete counts. The presence of a radioactive source is traditionally determined by an increase in the number of counts per minute with respect to that of the background. Hence, the counts are integrated for a period of time, e.g., one minute, and the number of counts per minute is determined. A background radiation count rate is also measured. When the source count exceeds some threshold above the background count, the source is determined to have been detected.

DETAILED DESCRIPTION

Figure 1A:
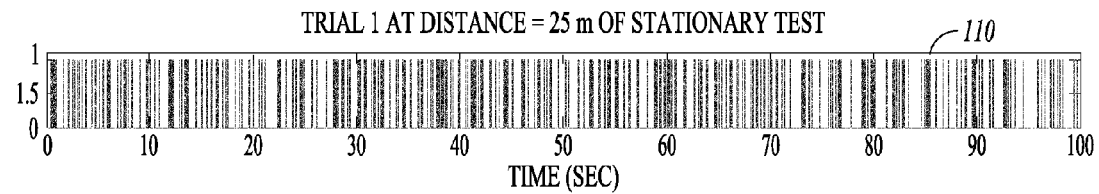
FIGS. 1A, 1B, 1C, and 1D illustrate an example output from a digitized data logger of radiation count pulses in a series of discrete values.
Figure 1B:
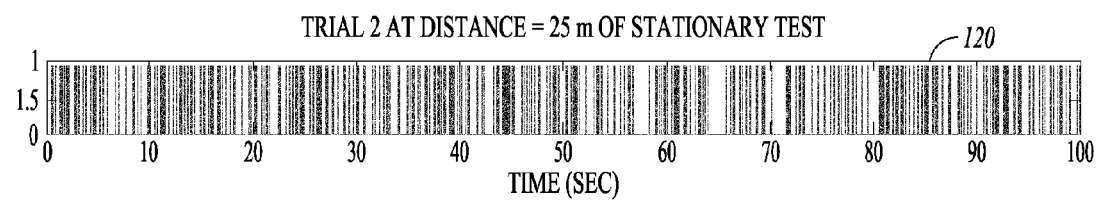
Figure 1C:
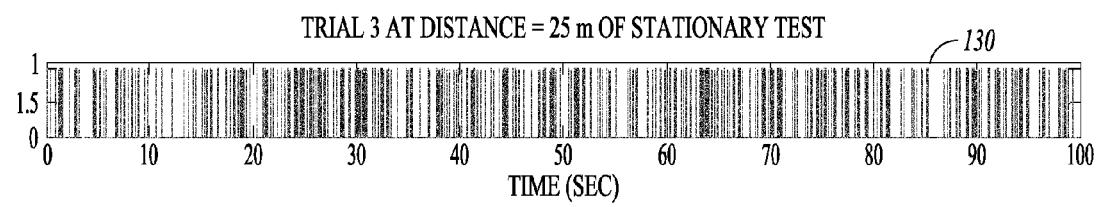
Figure 1D:
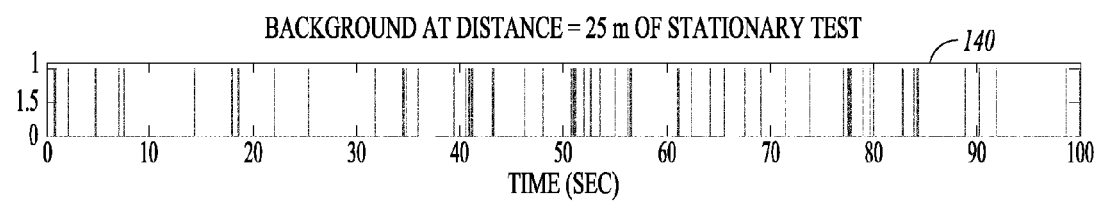
Figure 2A:
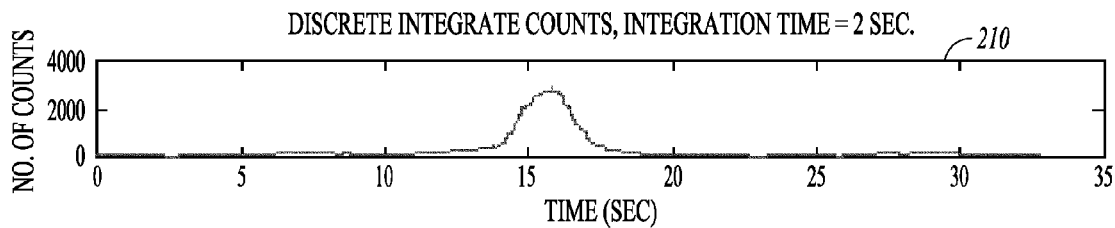
FIGS. 2A, 2B, 2C, 2D, 2E, 2F, 2G, and 2H illustrate radiation counts integrated over a range of discrete integration times.
Figure 2B:
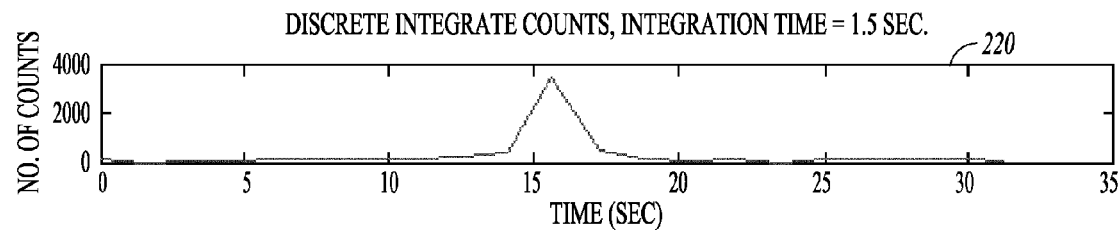
Figure 2C:
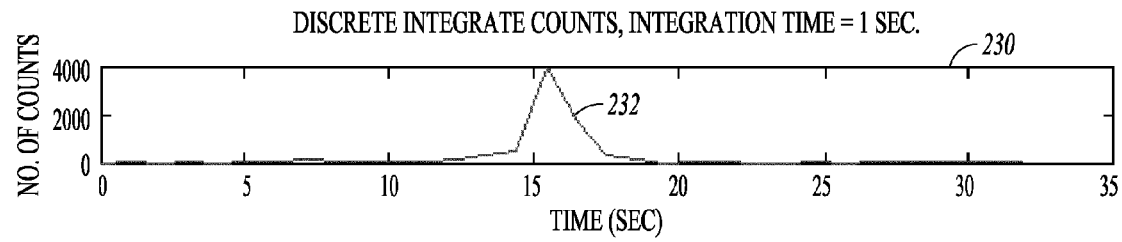
Figure 2D:
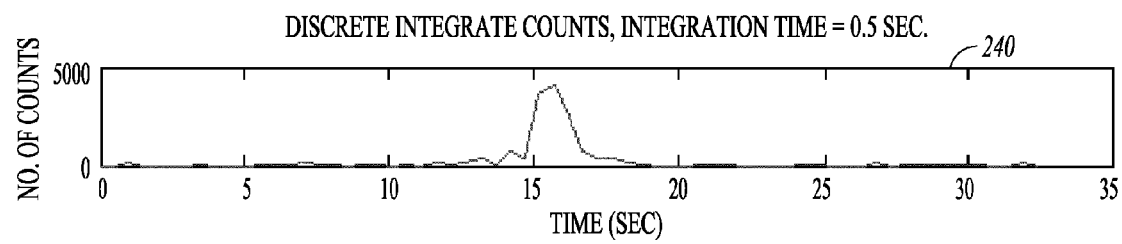
Figure 2E:
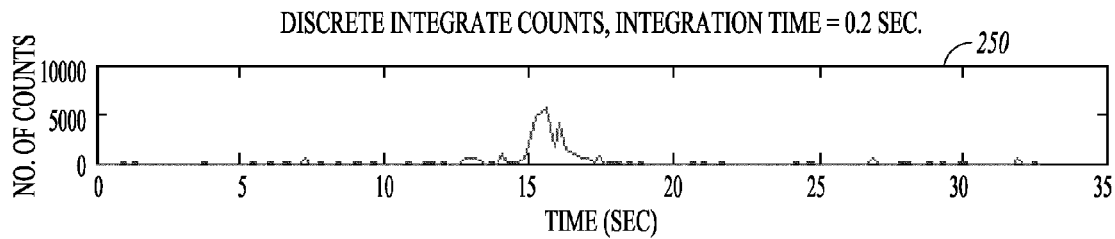
Figure 2F:
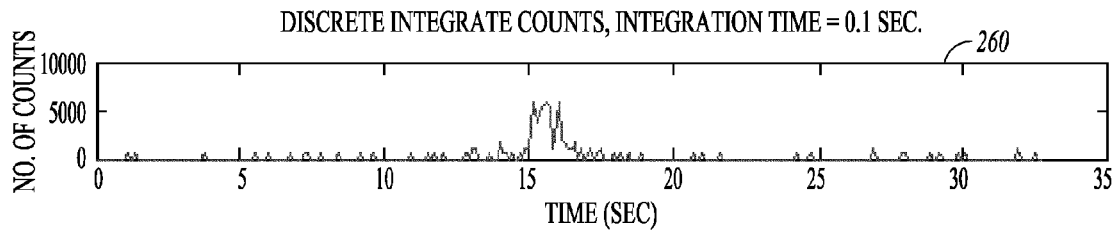
Figure 2G:
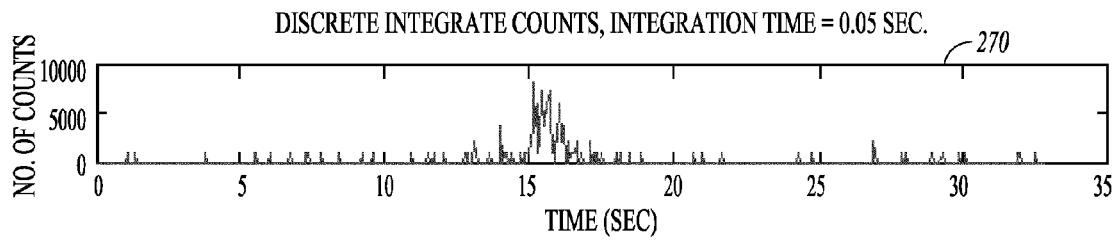
Figure 2H:
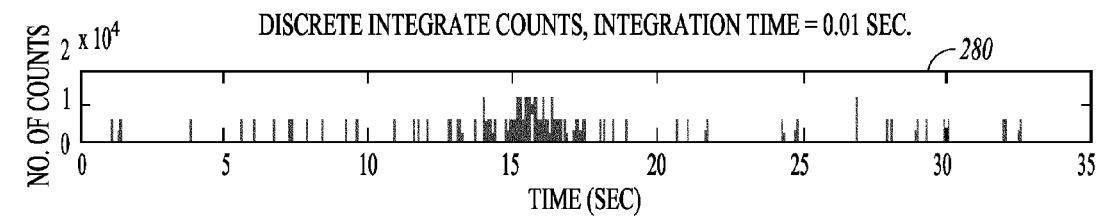

As noted above, a source of radiation can be detected by integrating radiation counts over a period of time, e.g., one minute, and then determining the number of counts per minute compared to that of the background. When detecting radiation and its sources, a longer integration time is typically preferred. This avoids false detection and ensures detection of even a small amount of target material.

When a radiation source is in motion, it would be helpful to be able to determine the precise location of the radiation source, especially when the radiation source could be one of many carriers within a field of view. For example, if the source is in a moving vehicle amongst road traffic, determining which vehicle contains the source will require a precise, short integration time. However, there is an uncertainty conflict in the integration time requirements. That is, there is a need to achieve accurate radiation detection, which is generally accomplished by using a long integration time. However, a long integration time normally results in a higher uncertainty in the detection time. But if a short detection time is implemented for the purpose of attaining a higher certainty of the time of detection (i.e., using a short integration time), the detection performance will likely suffer.

An embodiment resolves the conflict of long and short integration times based on the integration of the counts using a sliding window. A long integration time window, e.g., 2 seconds, is applied to cumulate the counts of a moving or other source. Then, the integration window moves over a short period of time, e.g., 0.01 second. The counts within this moving integration window are counted. The results are a smoothed time series and represent an increase and decrease of the counts as the moving source approaches and moves away from the detector. The location of the maximum of the count profile corresponds to the time when the source passes closest to the detector. For a fast moving radiation source, the radiation count profile is similar to a square wave, i.e., it rises very quickly to a peak value, levels off for a short duration, and drops back to the background level. In such a case the midpoint of the leveled off portion of the signal corresponds to the time that the source passes closest to the detector. Therefore, a precise localization of the source can be achieved. For a long integration time window, detection of low source activity can be determined.

Furthermore, additional characteristics of the source and its carrier can be estimated. The intensity emitted from the source can be determined from the peak of the detection counts. The speed of the source carrier can be estimated from the slope of the count profiles, i.e., the rise time, the fall time, and/or the duration of the detection of the source detection. These features will provide a potential estimate of the hazard level.

An embodiment can be implemented as a functional module or executable in a personal computer, a digital signal processor, field programmable gate array (FPGA), or special processor hardware. Such an embodiment can be combined with other radiation source monitoring applications. A fast implementation method can be achieved by an integral method. An integral method splits the total counts of the long integration time into two parts—a minor part and a major part, which is composed of n minor parts. The minor part corresponds to the sliding window duration, e.g., 0.01 seconds, and the major part is the remaining time, e.g. 1.99 seconds for a 2 second integration time. The current total counts at time t0 (C(t0)) are used to compute the next total counts at time t1, (C(t1)). That is, C(t1)=C(t0)−first minor(t0)+last minor(t1).

Additionally, there are many types of detectors based on the count principles. For example, one detector known in the art is based on photon counts. However, one or more embodiments are applicable to any detector that is based on integral count.

In an embodiment, the radiation detector produces a pulse per interaction between the detector and the radiation field. A data logger digitizes the arrival time and magnitude of the pulses into a series of discrete values. FIGS. 1A, 1B, 1C, and 1D illustrate the digitized outputs of the detectors in four trials (110, 120, 130, and 140). In this example, each trial covered a 100 second time period. The first three plots (110, 120, and 130) show outputs from three stationary tests, in which the distance from the radiation (145 mCi) source to the detector is approximately 25 meters. The fourth plot 140 illustrates the radiation counts from the background. A signal processing and detection algorithm differentiates the radiation source outputs from the background radiation.

The presence of a radiation source is traditionally determined based on the number of counts per minute within a period of time exceeding that of the background. Hence the counts, e.g., the counts in FIGS. 1A-1D, are integrated and the number of counts per minute is estimated. A background radiation count is measured. A source is detected when the source count exceeds a threshold, which is commonly computed as the background+2*sqrt(background).

Integration of the counts within a fixed time interval provides a good metric for detection. For detection purposes, a longer integration time is preferred. FIGS. 2A, 2B, 2C, 2D, 2E, 2F, 2G, and 2H show the counts integrated over a range of discrete integration times (210, 220, 230, 240, 250, 260, 270, and 280) of a radiation source moving towards and then away from a radiation detector. They show the results of the normal integration method using discrete integration time, which integrates the counts for a fixed time interval and then integrates the counts for the next fixed time interval and so forth. Note that there is no overlap between one time interval and the next. The count result using a 1 second integration time (230) yields better detection results, as indicated by the sharp, higher peak at 232 compared with the other integration times. As can be seen in 230, the time when the maximum count is located is 15.47 seconds. However, with that integration interval, the error could be within +/−0.5 seconds, and would not be short enough to reliably isolate a single vehicle or other radiation source. For example, a vehicle travelling at 30 mph covers 44 feet in a second. At this rate, many vehicles would be observed in 30 video frames, which correspond to a second of video data. Therefore, for localization purposes, a small integration time is preferred. Determining the best integration time often requires a tradeoff between detection and localization performance.

Figure 3A:
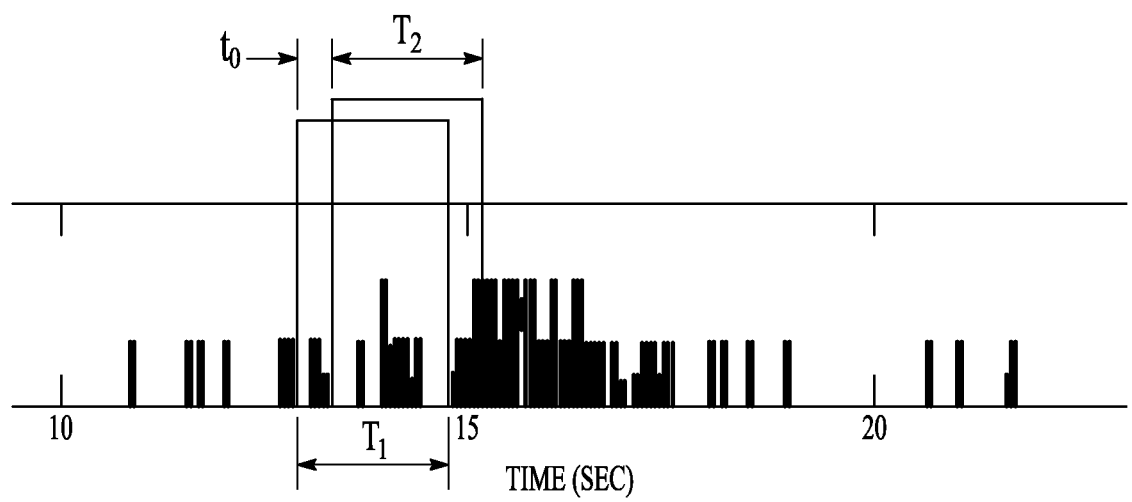
FIGS. 3A and 3B illustrate an integration time with a sliding window.
Figure 3B:
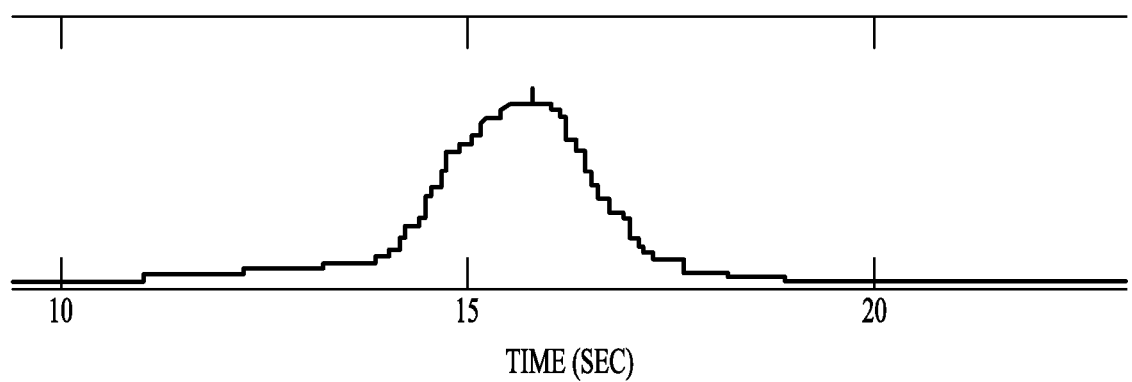
Figure 3C:
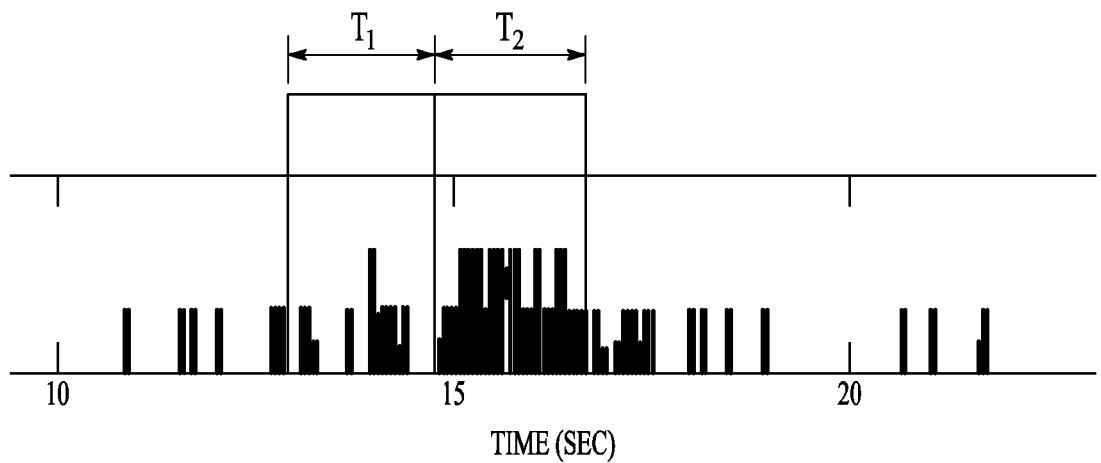
FIGS. 3C and 3D illustrates a discrete integration time.
Figure 3D:
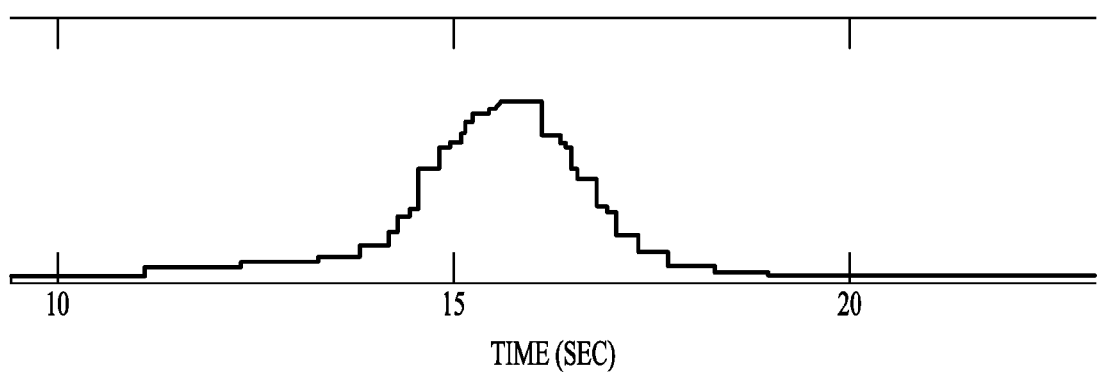
Figure 4A:
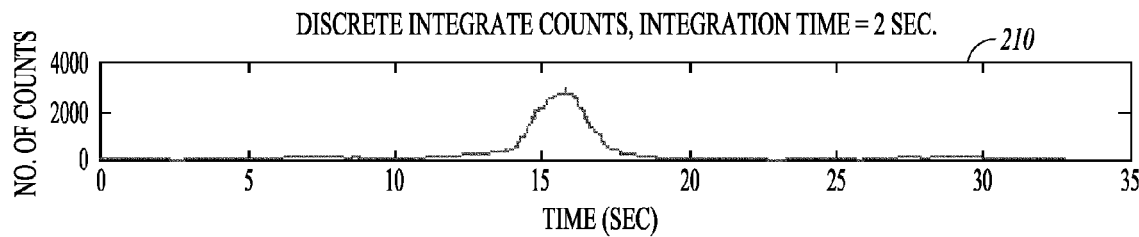
FIGS. 4A, 4B, 4C, 4D, 4E, 4F, and 4G illustrate radiation counts of a sliding integration.
Figure 4B:
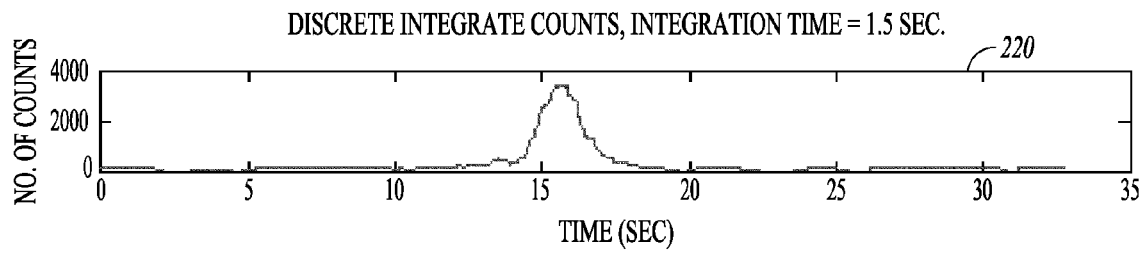
Figure 4C:
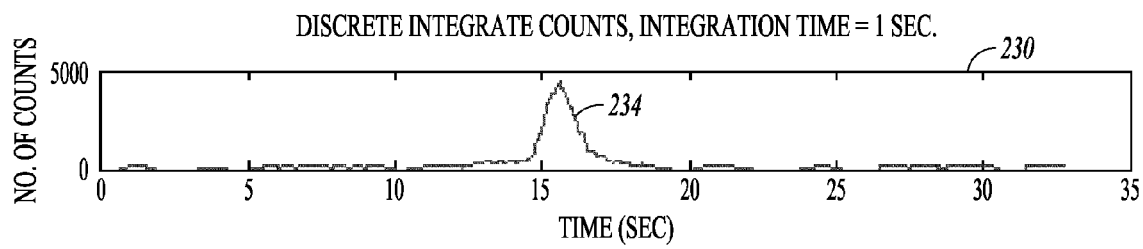
Figure 4D:
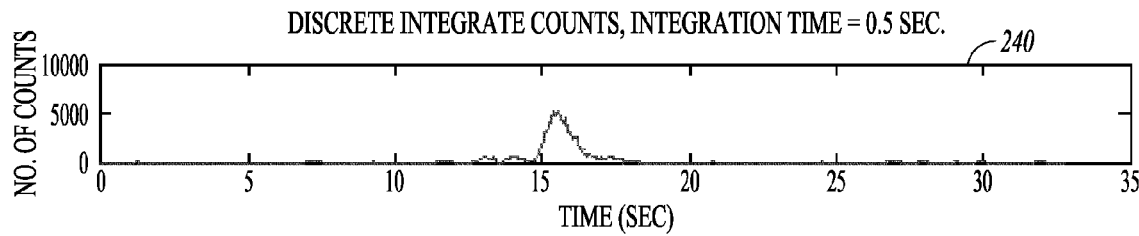
Figure 4E:
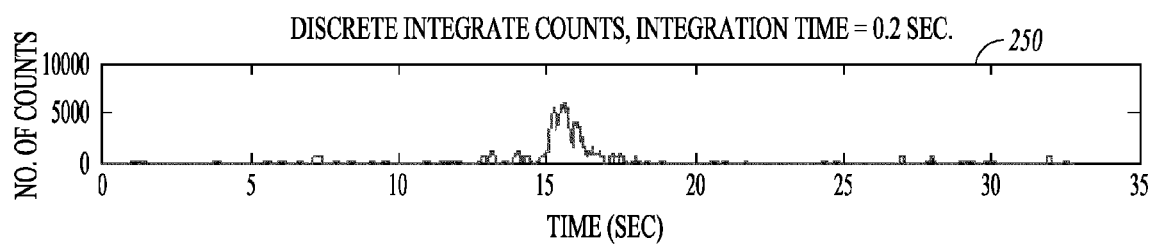
Figure 4F:
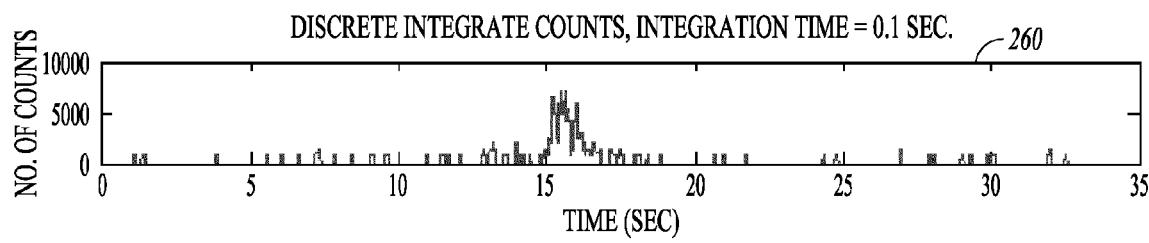
Figure 4G:
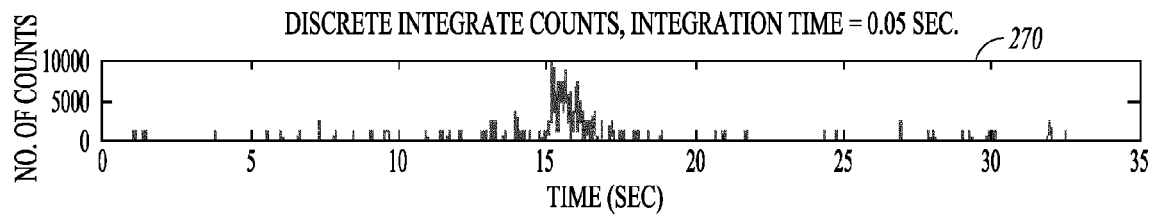

An embodiment resolves the issue of long and short integration times using a long integration time with sliding step. FIGS. 3A, 3B, 3C, and 3D illustrate diagrams of the integration time in a sliding step (FIGS. 3A, 3B) versus the traditional discrete integration time (FIGS. 3C, 3D). In FIGS. 3A, 3B, a long integration time, e.g., $T_1$, is applied to sum the radiation count. The next readout is the sum of radiation counts in the time interval, say $T_2$, which is $t_0$ away. Thus, a fine localization time is achieved while satisfying a long integration time. Computation time of this approach is also very efficient. FIG. 3A illustrates the results of an embodiment using a 0.01 second step size. Using the same 1 second integration time interval, the time when the peak count is located is 15.67 seconds. Hence, the carrier vehicle can be narrowed down to appear in the frames at 15.67 second +/−0.005 second, as illustrated in FIGS. 4A, 4B, 4C, 4D, 4E, 4F, and 4G, and in particular, in FIG. 4C at 230, 234. In FIGS. 3C, 3D, the same long integration time, e.g., $T_1$, is applied to sum the radiation count. The next readout is the sum of radiation counts in the time interval, say $T_2$, which does not overlap the first integration time, e.g. $T_1$. FIG. 3C illustrates the results of the discrete integration time.

Figure 8A:
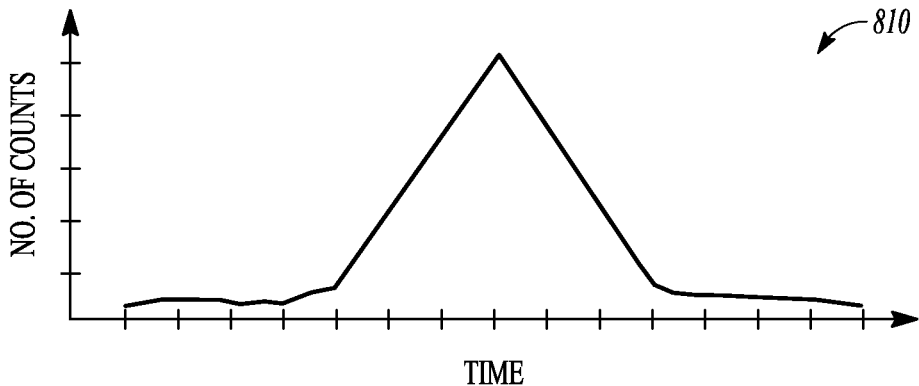
FIGS. 8A, 8B, and 8C illustrate the affects of the speed of the carrier and the intensity of radiation as a function of time.
Figure 8B:
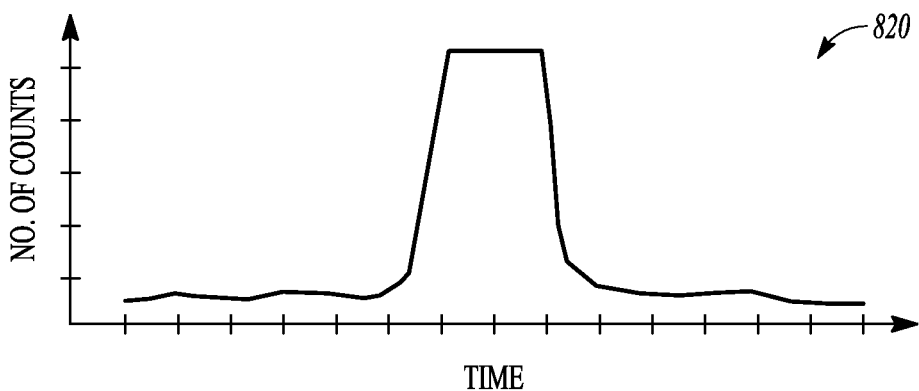
Figure 8C:
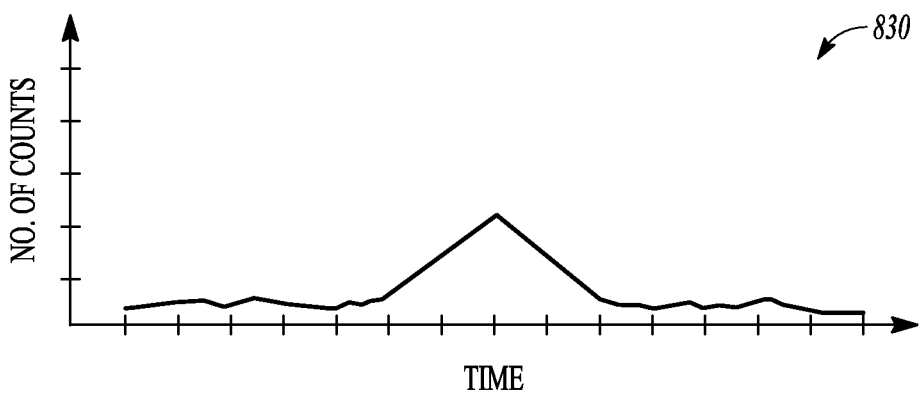

The speed of the radiation material carrier and the amount of radiation from the potentially shielded source affects the integration count. FIGS. 8A, 8B, and 8C illustrate the affects of the speed of the carrier and the intensity of radiation as a function of time. In FIG. 8A, at 810, the speed of the carrier is slow. The time duration of the integrated counts exceeding that of background is longer since a slow speed translates to a longer exposure time of the source to the detector. In addition, the rise to the peak integrated count and the fall from the peak back to background level would be gradual. In FIG. 8B, at 820, the speed of the carrier is fast since the total exposure time of the radiation source to the detector is shorter. Integrated counts start increasing later than that of a slower speed. The rise to the peak, however, is much steeper. A short plateau at the maximum peak count may be observed. Thus, in the case of slow speed carrier, the integrated count signal has a sawtooth shape; whereas in the case of a fast speed carrier, the signal resembles a square wave. In FIG. 8C, at 830, integrated counts of a small amount of radiation material on a slow carrier are shown. The peak integrated count is smaller. The time duration exceeding the background level is also smaller. Hence, based on the time duration, the rise time, the peak counts, and the peak time, the localization and the characteristics, such as intensity of the emitted radiation, can be estimated.

Figure 7:
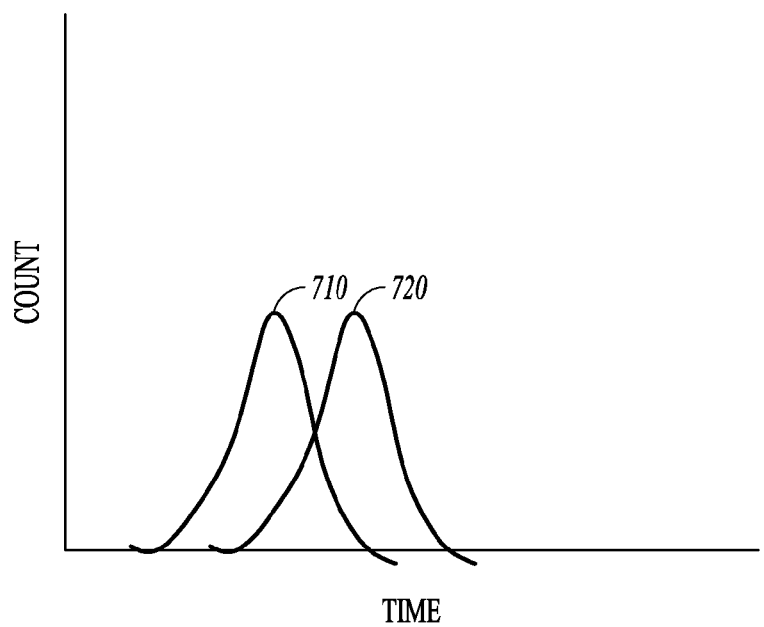
FIG. 7 illustrates a pair of peaks generated from the collection of radiation counts from two detectors.

In an embodiment, multiple detectors can be used, either at the same location, but with different orientations, and/or at different nearby locations. These additional detectors could provide additional information. For example, if one detector was at the top of a pole, and another detector at a 4 foot level on the pole, a determination could be made of which lane the vehicle is in. These factors resulting from the analysis of multiple detectors can be related to other detection media at the detector location, such as video cameras. FIG. 7 illustrates how other factors could be obtained from multiple peaks 710, 720 that can be obtained from two detection devices and ultimately related to other detection means such as video camera. In FIG. 7, the distance between the peaks 710, 720 can provide information on the speed and distance of the vehicle from a predetermined location. The shape of a peak 710, 720 may provide information on the source configuration and additional information on the thickness of shielding between the source and the detector. That is, from the multiple detector information, the difference in the time signature as illustrated in FIG. 7 will improve knowledge of the source transit speed and provide information on the location and movement of the source. The deviation of the source from the initial travel direction could also be determined, e.g., direction of a turn.

Figure 5A:
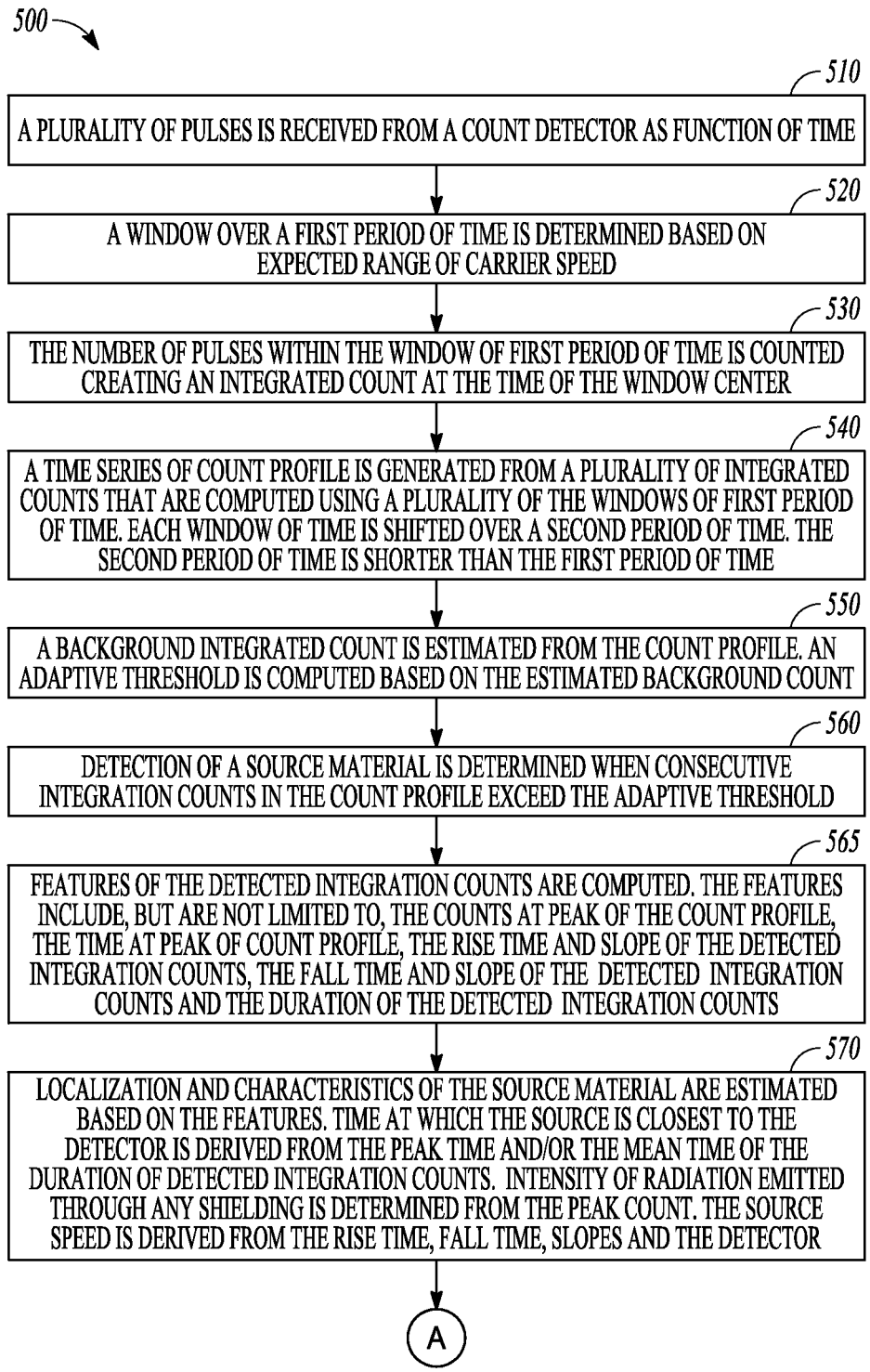
FIGS. 5A and 5B are a flowchart of an example embodiment of a process for detecting radiation.
Figure 5B:
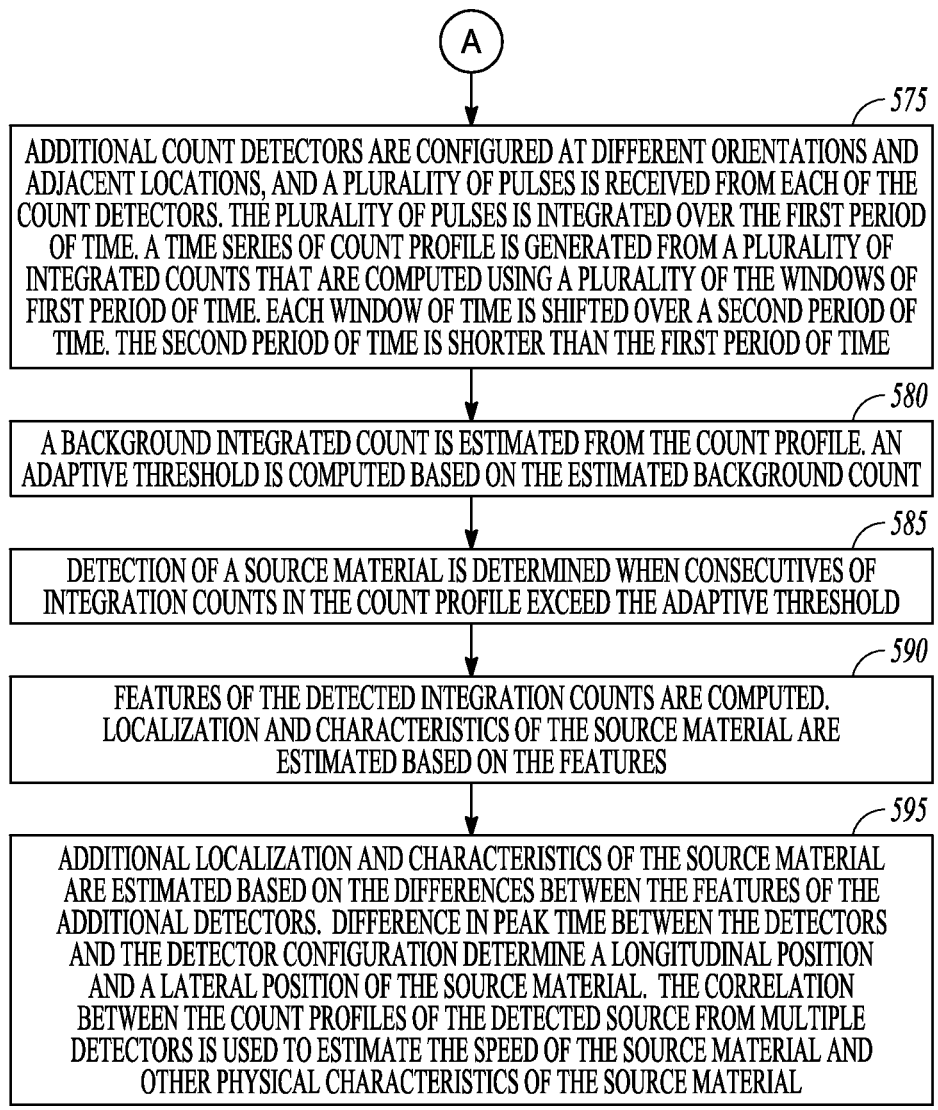

FIGS. 5A and 5B are a flowchart of an example process 500 for detection of a source material in a moving carrier. FIGS. 5A and 5B include a number of process blocks 510-595. Though arranged serially in the example of FIGS. 5A and 5B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 5A and 5B, at 510, a plurality of pulses is continuously received from a count detector over time. A pulse indicates a detection of a radiation unit which may be emitted from a source material or background. At 520, a window over a first period of time is determined based on the expected range of the speed of carriers. This window within the first period of time is the integration time. At 530, the plurality of pulses is integrated over the first period of time yielding an integrated count which is associated with a time at the center of the window. At 540, a continuous time series of count profiles is created from a plurality of integrated counts that are computed using a plurality of windows within the first period of time. Each window is shifted over a second period of time. The second period of time is shorter than the first period of time. At 550, a background integrated count is estimated from the history of the count profile. An adaptive threshold is computed based on the estimated background count. At 560, detection of a source material is determined when consecutives of the integration counts exceed the adaptive threshold. This reduces false alarm due to spurious noise. At 565, features of the detected source material, which is associated with a set of integration counts, are computed. These features include, but not limited to, the integrated count at the peak of the set of the integration counts, the time at the peak integrated count, the rise time and slope of the detected integrated counts, the fall time and slope of the detected integration time, and the duration of the detected integration counts. At 570, localization and characteristics of the detected source material are determined from the computed features. The time at which the source is closest to the detector is derived from the peak time and/or from the mean time of the duration of the detected integration rime. The source speed is derived from the rise time, fall time, slopes and the detector characteristics and configuration.

At 575, additional count detectors are configured at different orientations and adjacent locations, and a plurality of pulses is received from each of the count detectors, the plurality of pulses is integrated over the first period of time. A continuous time series of count profiles is created from a plurality of integrated counts that are computed using a plurality of windows within the first period of time. Each window is shifted over a second period of time. The second period of time is shorter than the first period of time. At 580, a background integrated count is estimated from the history of the count profiles. An adaptive threshold is computed based on the estimated background count. At 585, detection of a source material is determined when consecutives of the integration counts exceed the adaptive threshold. At 590, features of the detected source material, which is associated with a set of integration counts, are computed. Localization and characteristics of the detected source material are estimated based on the features. At 590, additional localization and characteristics of the source material are estimated based on the differences between the features of the additional detectors. A difference in peak time between the detectors and the detector configuration determines a longitudinal and lateral position of the source material. The correlation between the count profiles of the detected source material from multiple detectors is used to estimate the speed of the source material and other physical characteristics of the source material.

EXAMPLE EMBODIMENTS

Example No. 1 is a system including a count detector, a communication medium, and a processor coupled to the count detector. The processor is configured to continuously receive a plurality of pulses from the count detector, wherein a pulse indicates a detection of a radiation unit emitted from a source material or a background; determine a first period of time based on an expected range of speed of a carrier of the source material; integrate the plurality of pulses over the first period of time, thereby yielding an integrated count associated with a time at a midpoint of the first period of time; create a continuous time series of count profiles from a plurality of integrated counts that are computed using a plurality of windows within the first period of time; shift each window over a second period of time, wherein the second period of time is shorter than the first period of time; estimate a background count from a history of the count profiles; compute an adaptive threshold based on the estimated background count; and detect the source material when consecutives of the integrated counts exceed the adaptive threshold.

Example No. 2 includes the features of Example No. 1, and optionally includes a system wherein the processor is configured to compute features of the detected source material that are associated with a set of integrated counts.

Example No. 3 includes the features of Example Nos. 1-2, and optionally includes a system wherein the features include one or more of an integrated count at a peak of the set of the integrated counts, a time at a peak integrated count, a rise time and slope of the detected integrated counts, a fall time and a slope of a detected integrated time, and a duration of the detected integrated counts.

Example No. 4 includes the features of Example Nos. 1-3, and optionally includes a system wherein the processor is configured to determine localization and characteristics of the detected source material from the computed features.

Example No. 5 includes the features of Example Nos. 1-4 and optionally includes a system wherein the computer processor is configured to determine a time at which the source is closest to the detector as derived from one or more of the peak time and the mean time of the duration of the detected integrated time.

Example No. 6 includes the features of Example Nos. 1-5 and optionally includes a system comprising additional count detectors configured at different orientations and locations.

Example No. 7 includes the features of Example Nos. 1-6 and optionally includes a system wherein the processor is configured to receive a plurality of pulses from each of the count detectors, and to integrate the plurality of pulses over the first period of time, thereby creating a continuous time series of a count profile from a plurality of integrated counts that are computed using a plurality of windows of the first period of time; wherein each window is shifted over a second period of time, and wherein the second period of time is shorter than the first period of time.

Example No. 8 includes the features of Example Nos. 1-7 and optionally includes a system wherein the processor is configured to estimate a background count from a history of the count profiles; and to compute an adaptive threshold based on the estimated background count.

Example No. 9 includes the features of Example Nos. 1-8 and optionally includes a system wherein the processor is configured to detect the source material when consecutives of the integrated counts exceed the adaptive threshold.

Example No. 10 includes the features of Example Nos. 1-9 and optionally includes a system wherein the processor is configured to compute features of the detected source material associated with a set of integrated counts.

Example No. 11 includes the features of Example Nos. 1-10 and optionally includes a system wherein the processor is configured to estimate localization and characteristics of the detected source material based on the features.

Example No. 12 includes the features of Example Nos. 1-11 and optionally includes a system wherein the processor is configured to estimate additional localization and characteristics of the source material based on differences between the features of the additional detectors.

Example No. 13 includes the features of Example Nos. 1-12 and optionally includes a system wherein a difference in peak time between the detectors and the detector configuration determine a longitudinal and lateral position of the source material.

Example No. 14 includes the features of Example Nos. 1-13 and optionally includes a system wherein the processor is configured to use the correlation between the count profiles of the detected source material from multiple detectors to estimate a speed of the source material and other physical characteristics of the source material.

Example No. 15 is a process comprising continuously receiving a plurality of pulses from a count detector, wherein a pulse indicates a detection of a radiation unit emitted from a source material or a background; determining a first period of time based on an expected range of speed of a carrier of the source material; integrating the plurality of pulses over the first period of time, thereby yielding an integrated count associated with a time at a midpoint of the first period of time; creating a continuous time series of count profiles from a plurality of integrated counts that are computed using a plurality of windows within the first period of time; shifting each window over a second period of time, wherein the second period of time is shorter than the first period of time; estimating a background count from a history of the count profiles; computing an adaptive threshold based on the estimated background count; and detecting the source material when consecutives of the integrated counts exceed the adaptive threshold.

Example No. 16 includes the features of Example No. 16 and optionally includes determining localization and characteristics of the detected source material from the computed features.

Example No. 17 includes the features of Example Nos. 15-16 and optionally includes determining a time at which the source is closest to the detector as derived from one or more of the peak time and the mean time of the duration of the detected integrated time.

Example No. 18 is a tangible non-transitory computer readable storage device comprising instructions that when executed by a processor execute a process comprising continuously receiving a plurality of pulses from a count detector, wherein a pulse indicates a detection of a radiation unit emitted from a source material or a background; determining a first period of time based on an expected range of speed of a carrier of the source material; integrating the plurality of pulses over the first period of time, thereby yielding an integrated count associated with a time at a midpoint of the first period of time; creating a continuous time series of count profiles from a plurality of integrated counts that are computed using a plurality of windows within the first period of time; shifting each window over a second period of time, wherein the second period of time is shorter than the first period of time; estimating a background count from a history of the count profiles; computing an adaptive threshold based on the estimated background count; and detecting the source material when consecutives of the integrated counts exceed the adaptive threshold.

Example No. 19 includes the features of Example No. 18, and optionally includes additional count detectors configured at different orientations and locations; wherein the processor is configured to receive a plurality of pulses from each of the count detectors, and to integrate the plurality of pulses over the first period of time, thereby creating a continuous time series of a count profile from a plurality of integrated counts that are computed using a plurality of windows of the first period of time; wherein each window is shifted over a second period of time, and wherein the second period of time is shorter than the first period of time.

Example No. 20 includes the features of Example Nos. 18-19 and optionally includes instructions to estimate a background count from a history of the count profiles; and to compute an adaptive threshold based on the estimated background count; wherein the processor is configured to detect the source material when consecutives of the integrated counts exceed the adaptive threshold.

Figure 6:
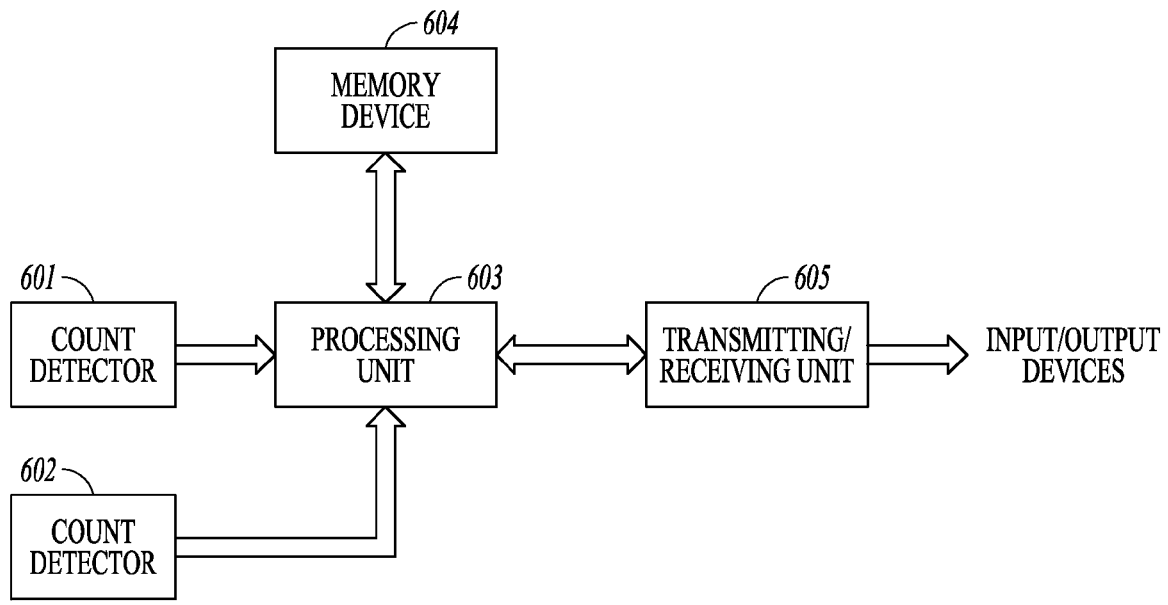
FIG. 6 illustrates an example embodiment of a computer processing system upon which one or more embodiments of the present disclosure can execute.

FIG. 6 is an overview diagram of a hardware and operating environment in conjunction with which embodiments of the invention may be practiced. The description of FIG. 6 is intended to provide a brief, general description of suitable hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a count detector 601 is connected via a data input/output link to a processor 603. The count detector converts detection of an event, such as a radiation particle, or a photon, into a count/pulse, which is then sent to processor 603. Processor 603 is connected to a memory device 604 via its second input/output port. Processor 603 executes the instructions that are stored in memory device 604, which can have both permanent and temporary storage. The set of instructions include, but are not limited to, integration of the counts from detector 601, detection of the radiation from the target material, and sending a detection alert to transmitting/receiving unit 605. Transmitting/receiving unit 605 is connected to a third data input/output port of processor 603. The transmitting/receiving unit 605 communicates through a wired and/or wireless connection with other input and output devices such as a display, a hard disk, an operator terminal, a camera, an alarm, and a monitor. Additional count detectors 602 may also be connected to processor 603. The processor 603 has a timer that enables the timing of the events, the integration of counts within specific time and synchronization of the inputs from count detectors 601, 602.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a count detector;
a communication medium; and
a processor coupled to the count detector;
wherein the processor is configured to:
continuously receive a plurality of pulses from the count detector, wherein a pulse indicates a detection of a radiation unit emitted from a source material or a background;
determine a first period of time based on an expected range of speed of a carrier of the source material;
integrate the plurality of pulses over the first period of time, thereby yielding an integrated count associated with a time at a midpoint of the first period of time;
create a continuous time series of count profiles from a plurality of integrated counts that are computed using a plurality of windows within the first period of time;
shift each window over a second period of time when pulses in a window increase as the source material approaches the count detector, wherein the second period of time is shorter than the first period of time;
estimate a background count from a history of the count profiles;
compute an adaptive threshold based on the estimated background count; and
detect the source material when consecutives of the integrated counts exceed the adaptive threshold.

2. The system of claim 1, wherein the processor is configured to compute features of the detected source material that are associated with a set of integrated counts.

3. The system of claim 2, wherein the features include one or more of an integrated count at a peak of the set of the integrated counts, a time at a peak integrated count, a rise time and slope of the detected integrated counts, a fall time and a slope of a detected integrated time, and a duration of the detected integrated counts.

4. The system of claim 2, wherein the processor is configured to determine localization and characteristics of the detected source material from the computed features.

5. The system of claim 1, wherein the computer processor is configured to determine a time at which the source is closest to the detector as derived from one or more of the peak time and the mean time of the duration of the detected integrated time.

6. The system of claim 1, comprising additional count detectors configured at different orientations and locations.

7. The system of claim 6, wherein the processor is configured to receive a plurality of pulses from each of the count detectors, and to integrate the plurality of pulses over the first period of time, thereby creating a continuous time series of a count profile from a plurality of integrated counts that are computed using a plurality of windows of the first period of time; wherein each window is shifted over a second period of time, and wherein the second period of time is shorter than the first period of time.

8. The system of claim 7, wherein the processor is configured to estimate a background count from a history of the count profiles; and to compute an adaptive threshold based on the estimated background count.

9. The system of claim 8, wherein the processor is configured to detect the source material when consecutives of the integrated counts exceed the adaptive threshold.

10. The system of claim 7, wherein the processor is configured to compute features of the detected source material associated with a set of integrated counts.

11. The system of claim 10, wherein the processor is configured to estimate localization and characteristics of the detected source material based on the features.

12. The system of claim 11, wherein the processor is configured to estimate additional localization and characteristics of the source material based on differences between the features of the additional detectors.

13. The system of claim 12, wherein a difference in peak time between the detectors and the detector configuration determine a longitudinal and lateral position of the source material.

14. The system of claim 13, wherein the processor is configured to use the correlation between the count profiles of the detected source material from multiple detectors to estimate a speed of the source material and other physical characteristics of the source material.

15. A process comprising:
continuously receiving a plurality of pulses from a count detector, wherein a pulse indicates a detection of a radiation unit emitted from a source material or a background;
determining a first period of time based on an expected range of speed of a carrier of the source material;
integrating the plurality of pulses over the first period of time, thereby yielding an integrated count associated with a time at a midpoint of the first period of time;
creating a continuous time series of count profiles from a plurality of integrated counts that are computed using a plurality of windows within the first period of time;
shifting each window over a second period of time when pulses in a window increase as the source material approaches the count detector, wherein the second period of time is shorter than the first period of time;
estimating a background count from a history of the count profiles;
computing an adaptive threshold based on the estimated background count; and
detecting the source material when consecutives of the integrated counts exceed the adaptive threshold.

16. The process of claim 15, comprising determining localization and characteristics of the detected source material from the computed features.

17. The process of claim 15, comprising determining a time at which the source is closest to the detector as derived from one or more of the peak time and the mean time of the duration of the detected integrated time.

18. A tangible non-transitory computer readable storage device comprising instructions that when executed by a processor execute a process comprising:
continuously receiving a plurality of pulses from a count detector, wherein a pulse indicates a detection of a radiation unit emitted from a source material or a background;
determining a first period of time based on an expected range of speed of a carrier of the source material;
integrating the plurality of pulses over the first period of time, thereby yielding an integrated count associated with a time at a midpoint of the first period of time;
creating a continuous time series of count profiles from a plurality of integrated counts that are computed using a plurality of windows within the first period of time;
shifting each window over a second period of time when pulses in a window increase as the source material approaches the count detector, wherein the second period of time is shorter than the first period of time;
estimating a background count from a history of the count profiles;
computing an adaptive threshold based on the estimated background count; and
detecting the source material when consecutives of the integrated counts exceed the adaptive threshold.

19. The tangible non-transitory computer readable storage device of claim 18, comprising additional count detectors configured at different orientations and locations; wherein the processor is configured to receive a plurality of pulses from each of the count detectors, and to integrate the plurality of pulses over the first period of time, thereby creating a continuous time series of a count profile from a plurality of integrated counts that are computed using a plurality of windows of the first period of time; wherein each window is shifted over a second period of time, and wherein the second period of time is shorter than the first period of time.

20. The tangible non-transitory computer readable storage device of claim 19, comprising instructions to estimate a background count from a history of the count profiles; and to compute an adaptive threshold based on the estimated background count; wherein the processor is configured to detect the source material when consecutives of the integrated counts exceed the adaptive threshold.

* * * * *